United States Patent
Martin et al.

(10) Patent No.: US 10,600,223 B2
(45) Date of Patent: Mar. 24, 2020

(54) METHODS AND SYSTEMS FOR DETERMINING THE STRUCTURE OF A SORTED COLLECTION LIST OF LAYOUTS

(71) Applicants: Laurent Francois Martin, Carlsbad, CA (US); Narendra Dubey, San Francisco, CA (US)

(72) Inventors: Laurent Francois Martin, Carlsbad, CA (US); Narendra Dubey, San Francisco, CA (US)

(*) Notice: Subject to any disclaimer, the term of this patent is extended or adjusted under 35 U.S.C. 154(b) by 0 days.

(21) Appl. No.: 16/232,992

(22) Filed: Dec. 26, 2018

(65) Prior Publication Data

US 2019/0206105 A1 Jul. 4, 2019

Related U.S. Application Data

(60) Provisional application No. 62/612,012, filed on Dec. 29, 2017.

(51) Int. Cl.
| | |
|---|---|
| *G06T 11/60* | (2006.01) |
| *G06K 9/62* | (2006.01) |
| *G06T 7/50* | (2017.01) |
| *G06T 3/00* | (2006.01) |
| *G06F 8/38* | (2018.01) |
| *G06T 3/60* | (2006.01) |
| *G06T 3/40* | (2006.01) |
| *G06T 3/20* | (2006.01) |

(52) U.S. Cl.
CPC ............... *G06T 11/60* (2013.01); *G06F 8/38* (2013.01); *G06K 9/6215* (2013.01); *G06T 3/0068* (2013.01); *G06T 7/50* (2017.01); *G06T 3/20* (2013.01); *G06T 3/40* (2013.01); *G06T 3/60* (2013.01)

(58) Field of Classification Search
CPC ... G06T 11/60; G06T 3/20; G06T 3/40; G06T 3/60
See application file for complete search history.

(56) References Cited

U.S. PATENT DOCUMENTS

| | | | | |
|---|---|---|---|---|
| 2002/0122067 A1* | 9/2002 | Geigel | ............ | G06K 9/6229 715/788 |
| 2009/0031269 A1* | 1/2009 | Chen | ............ | G06F 17/5072 716/119 |
| 2013/0298013 A1* | 11/2013 | Hunter | ............ | G06F 17/2241 715/243 |

* cited by examiner

*Primary Examiner* — Jeffery A Brier
(74) *Attorney, Agent, or Firm* — Mannava & Kang, P.C.; Vinay Malik

(57) ABSTRACT

Embodiments herein disclose methods and systems for determining the structure of a sorted collection list of layouts by optimizing the organization of a collection of objects on a layout based on series of narrative and aesthetic criteria that vary for each set of objects and/or layout.

16 Claims, 10 Drawing Sheets

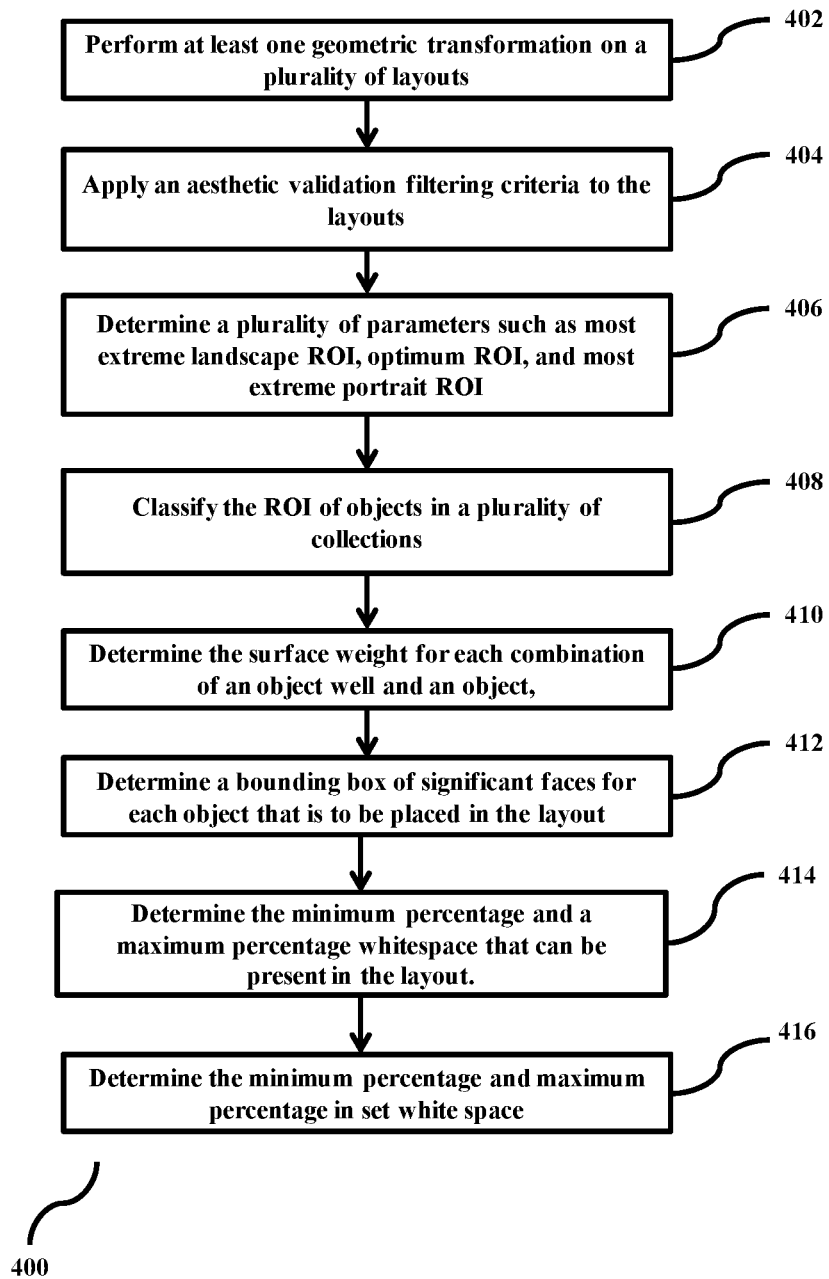

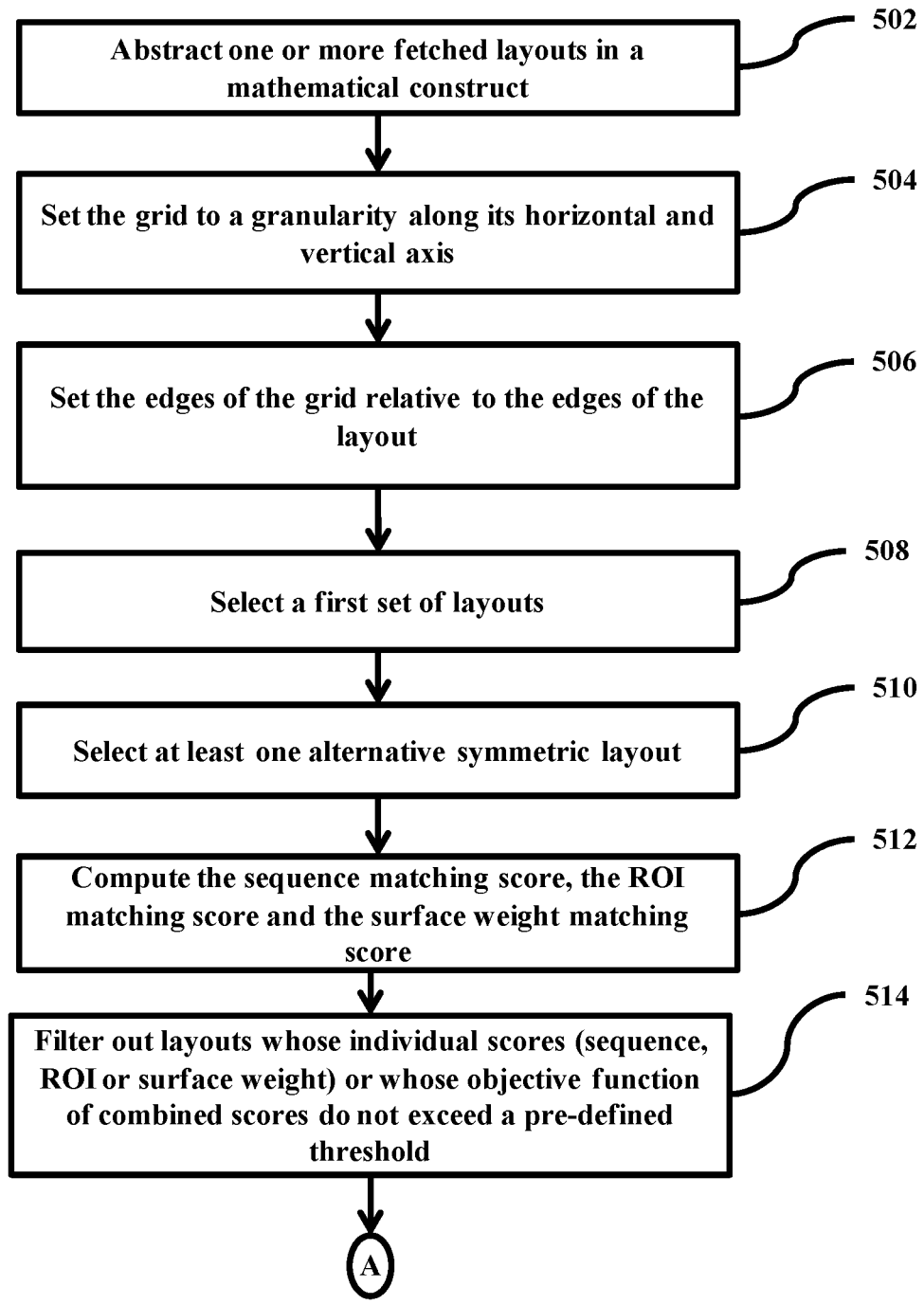

METHODS AND SYSTEMS FOR DETERMINING THE STRUCTURE OF A SORTED COLLECTION LIST OF LAYOUTS

CROSS REFERENCE TO RELATED APPLICATION

This application is based on and derives the benefit of U.S. Provisional Application 62/612,012, the contents of which are incorporated herein by reference.

TECHNICAL FIELD

The embodiments herein relate to visual graphic design and layouts in a layout and, more particularly, to arrangement of objects in at least one pre-defined layout.

BACKGROUND

The current solutions for layout are not able to accommodate all of the narrative and aesthetic constraints required to create an aesthetically pleasing and narratively consistent layout. To meet the narrative requirements, the objects assigned to a layout need to be organized so that they correspond to the narratively selected sequence. The coverage provided to each object on the layout, needs to be proportional to the narrative importance of each object relative to each other. This can be difficult as the objects may have variable aspect ratios from extreme landscape to extreme portrait via a regular square. From an aesthetic perspective, the layout needs to meet visual requirements such as percentage and distribution of the white space between the objects, edge adjacency of object to side of the layout (bleed), overlapping of objects, narrative value and visual organization of the content of each object, alignment of the edges of the objects relative to each other including possibly rotation of the object.

BRIEF DESCRIPTION OF THE FIGURES

The embodiments disclosed herein will be better understood from the following detailed description with reference to the drawings, in which:

FIG. 4 is a flowchart depicting the process a plurality of layouts and storing the layouts, according to embodiments as disclosed herein;

FIGS. 5A and 5B are flowcharts depicting the process of determining the structure of a sorted collection list of layouts by optimizing the organization of a collection of objects on a layout based on series of narrative and aesthetic criteria that vary for each set of objects and/or layout, wherein the destination spread is at least one of a front cover, a back cover, a one-page or a spread without a crease, according to embodiments as disclosed herein.

DETAILED DESCRIPTION OF EMBODIMENTS

Figure 1A:
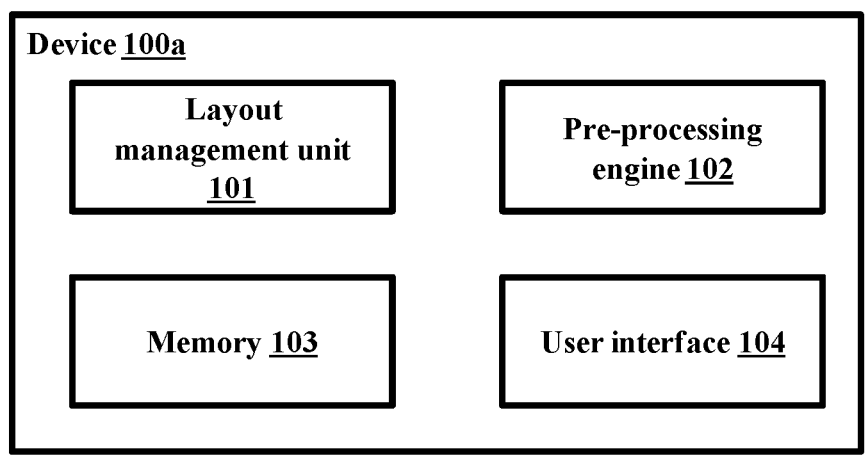
FIGS. 1A, 1B and 1C depict a system for determining the structure of a sorted collection list of layouts by optimizing the organization of a collection of objects on a layout based on series of narrative and aesthetic criteria that vary for each set of objects and/or layout, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for determining the structure of a sorted collection list of layouts by optimizing the organization of a collection of objects on a layout based on series of narrative and aesthetic criteria that vary for each set of objects and/or layout. Referring now to the drawings, and more particularly to FIGS. 1A through 6, where similar reference characters denote corresponding features consistently throughout the figures, there are shown embodiments.

Layout' as referred to herein can be a "base" or "background" 2-D geometric surface of any suitable shape, wherein one or more geometric objects are overlaid on the layout. Layouts can be a combination of at least one of statically pre-determined layouts and dynamically generated layouts (wherein the dynamically generated layout can be dynamically generated at runtime). Layouts can comprise of different categories (also referred to herein as spread), such as front cover, back cover, first inside page, last inside page, one-page left, one-page right, two-page layout, 2-page layout crease compatible, and so on. Each layout can comprise of a configurable number of wells, wherein objects can be placed into the wells present in the layout. The layout can be of a pre-defined aspect ratio (H×W). The aesthetic characteristic of a layout can be described using a multi-dimensional vector, hereinafter referred to as an aesthetic vector. Examples of the geometric objects can be, but not limited to, rectangles, squares, circles, diamonds, and so on. Embodiments herein have used the terms 'layout', 'canvas' to indicate the layout interchangeably.

An alternate symmetric layout family can be defined as a collection of layouts in which any layout in the family can be transformed into any other layout of that family via a sequence of geometric transformations such as symmetry (axial or central) or translation of on-page or two-page of the layout.

Layouts can be categorized in a plurality of aesthetic categories based on how the wells are positioned in a layout. This categorization is independent of the number of wells a layout contains. For example, layouts having all of their wells extreme left, right, top and bottom edges on the edge of the layout are considered to be one category ("reportage"). In another example, all layouts having all their wells' extreme left, right, top and bottom edges at $\frac{1}{24}$, $\frac{1}{12}$ or $\frac{3}{24}$ of the edge of the layouts are considered to be in one category ("inset reportage"). In another example, all layouts having their wells' extreme left side edges on the left side of the layout are considered to be in one category ("left bleed"), and so on.

Layout well sequence is a numbering sequence in which a user would sequentially view the wells in that layout. There may be more than one layout well sequence on layout.

'Object' as referred to herein can refer to a 2-dimensional geometric object, which can be placed on a layout. In an embodiment herein, the user can provide the objects in real-time. In an embodiment herein, the objects can be fetched from a pre-defined location such as a database, a file server, a data server, Cloud storage, and so on. In an embodiment herein, a user can place one or more objects on the layout. In an embodiment herein, one or more objects can be placed automatically on the layout. Examples of the object can be, but not limited to, photos, paintings, sketches, drawings, graphic art, clip art, stickers, text, decorative text, and so on.

Each object and each well can be associated with a normalized slope value and an aspect ratio category. The mathematical definition of the normalized slope and aspect ratio category may vary from one embodiment of this method to another.

Figure 1B:
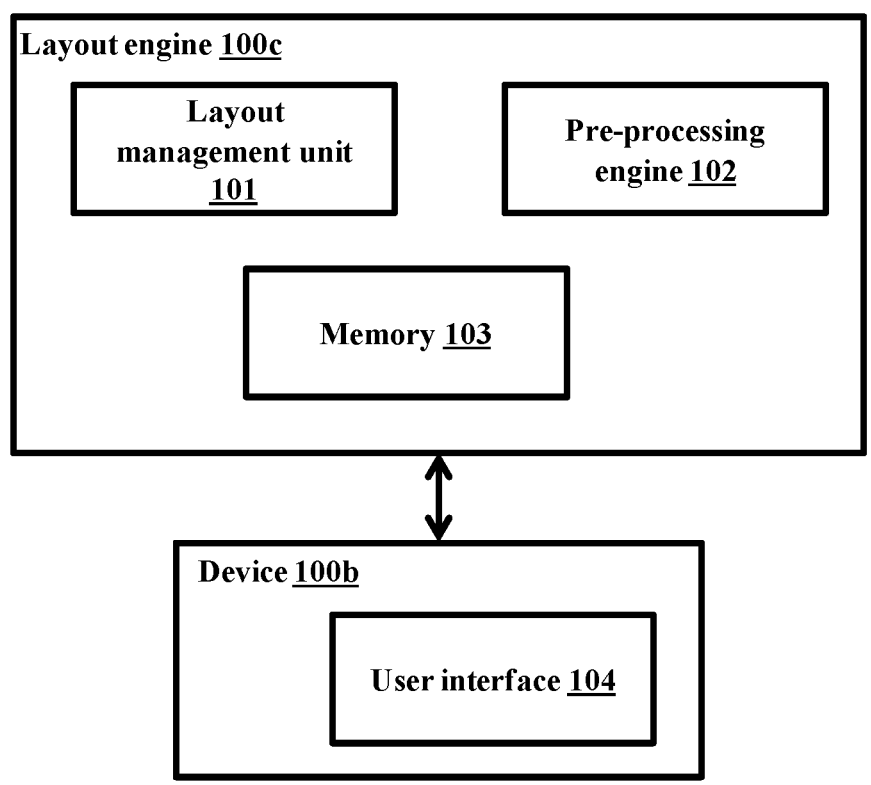
Figure 1C:
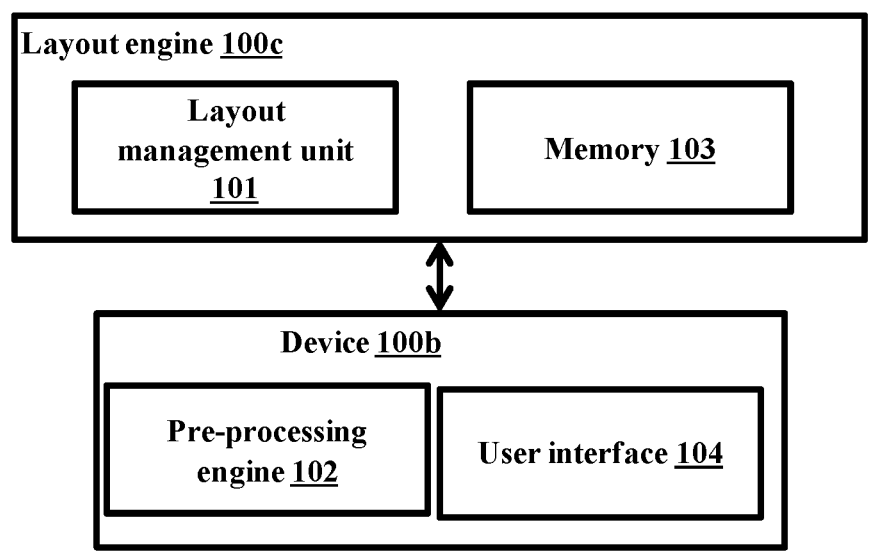

FIGS. 1A, 1B and 1C depict a system 100 for determining the structure of a sorted collection list of layouts by optimizing the organization of a collection of objects on a layout based on series of narrative and aesthetic criteria that vary for each set of objects and/or layout. The system 100, as depicted in FIG. 1A, can also be referred as device 100a. The system 100a can be resided within the device 100a and may be connected to other modules using at least one of a wired means and/or a wireless means. The device 100a or the system 100 further comprises a layout management unit 101, a pre-processing engine 102, a memory 103, and at least one user interface 104. Accordingly, the layouts can be fetched from the memory 103 by the layout management unit 101, a pre-processing engine 102. Further, the pre-processing engine 102 can store the transformed layouts in the memory 103 or any other suitable location such as the cloud, a file server, a data server, and so on. The pre-processing engine 102 can further filter out layouts that already present in the memory 103, so that the memory 103 does not include any duplicates. Also, the layout management unit 101 can further fetch one or more layouts from the memory 103. In an embodiment herein, the layout management unit 101 can fetch all layouts present in the memory 103. Alternatively, among other capabilities, the at least one processor (not shown in FIG. 1A, 1B, 1C) may be configured to fetch and execute computer-readable instructions stored in the memory 103. Examples of the device 100a or the system 100 can be, but not limited to, a laptop, a computer, a mobile phone, a smart phone, an Internet of Things (IoT) device, a wearable computing device, a server, and so on.

The system 100, as depicted in FIG. 1B, can comprise a device 101b and a layout engine 100c. The layout engine 100c can reside in the device 100a or in a remote server such as cloud computing server, a standalone server, and so on. The device 100b and the layout engine 100c may be connected to each other using the wired/wireless means. Accordingly, the system 100 can be a standalone device 100a and can also be a combination of device 100a and device 100b. The device 100b can comprise at least one user interface 104. The user interface 104 in the device 100b can enable the user to provide at least one input to the layout engine 100c, via the device 100b. Examples of the layout engine 100 c can be, but not limited to, a server, a file server, a data server, the cloud, and so on. The layout engine 100c can further comprise a layout management unit 101, a pre-processing engine 102, and a memory 103.

The system 100, as depicted in FIG. 1C, can comprise a the device 101b and the layout engine 100c. Accordingly, the device 100b can also comprise at least one user interface 104 and the pre-processing engine 102. The device 100b can be connected to a layout engine 100c using at least one of a wired means and/or a wireless means. The layout engine 100c can reside in the device 100a or in a remote server such as cloud computing server, a standalone server, and so on. Examples of the layout engine 100c can be, but not limited to, a server, a file server, a data server, the cloud, and so on. The layout engine 100c can further comprise the layout management unit 101, and the memory 103. As depicted in FIGS. 1B and 1C, the preprocessing engine 102 can either reside in the device 100a or the device 100b. The pre-processing engine 102 can further filter out layouts that are already present in the memory 103, so that the memory 103 does not include any duplicates. The pre-processing engine 102 can categorize the layouts according to one or more aesthetic categories. The categorization of the layouts (or information of the categories) can be used by the layout management unit 101. In an example, for each object provided by the user, the pre-processing engine 102 can determine a plurality of parameters such as most extreme landscape Region of Interest (ROI), optimum ROI, and most extreme portrait ROI. Further, the Region of Interest (ROI), or data related to Region of Interest (ROI), the categories, data related to layouts, may be obtained/transferred by/to the layout management unit 101 based on the request/requirement.

The user interface 104 can enable the user and/or an authorized user (such as an administrator) to provide at least one input to the layout management unit 101 via the device 100a or the device 100b. Considering an example of a the user, the user may provide input to select/choose at least one object, of the user preferences related to the placement/location of the objects, preferred layouts, and so on, using the user interface 104. Considering an example of the authorized user, the authorized user may provide/enable the device 100a or the device 100b objects, layouts, types of objects, layouts for each user, and other related preferences, that can be later used by the user or the device 100a or the device 100b. Examples of the user interface 104 can be, but not limited to, a display, a touch screen, a keyboard, a mouse, and so on.

The pre-processing engine 102 can pre-process a plurality of layouts in the device 100a or the device 100b, by performing at least one geometric transformation. The plurality of layouts can be fetched from the memory 103 of the device 100a, or be provided in real time by the authorized user. Examples of the geometric transformation can be, but not limited to, central shrinking, directional panning, side (top, bottom, left, right) cropping, rotation, symmetry and any combination of those operations. In an example, the following are examples of geometric transformations that can be applied by the pre-processing engine 102 of the device 100a or the device 100b:

All object wells bleeding on the left side of a page of the layout are cropped to their left by a pre-defined distance (for example, ¹⁄₂₄) of the width of the page.

All object wells bleeding on the left side of the page are cropped to their left by a pre-defined distance (for example, ¹⁄₁₂) of the width of the page.

All object wells bleeding on the left side of the page are cropped to their left by a pre-defined distance (for example, ³⁄₂₄) of the width of the page.

All object wells bleeding on the right side of the page are cropped to their right by a pre-defined distance (for example, ¹⁄₂₄) of the width of the page.

All object wells bleeding on the right side of the page are cropped to their right by a pre-defined distance (for example, ¹⁄₁₂) of the width of the page.

All object wells bleeding on the right side of the page are cropped to their right by a pre-defined distance (for example, ³⁄₂₄) of the width of the page.

All object wells bleeding on the left side of the page are cropped to their left by a pre-defined distance (for example, ¹⁄₂₄) of the width of the page and all object wells bleeding on the right side of the page are cropped by a pre-defined distance (for example, ¹⁄₂₄) of the width of the page.

All object wells bleeding on the left side of the page are cropped to their left by a pre-defined distance (for example, ¹⁄₁₂) of the width of the page and all object wells bleeding on the right side of the page are cropped by a pre-defined distance (for example, ¹⁄₁₂) of the width of the page.

All object wells bleeding on the left side of the page are cropped to their left by a pre-defined distance (for example, ³⁄₂₄) of the width of the page and all object wells bleeding on the right side of the page are cropped by a pre-defined distance (for example, ³⁄₂₄) of the width of the page.

All object wells bleeding on the top of the page are cropped on their top by a pre-defined distance (for example, ¹⁄₂₄) of the height of the page and all object wells bleeding on the bottom side of the page are cropped at their bottom by a pre-defined distance (for example, ¹⁄₂₄) of the height of the page.

All object wells bleeding on the top of the page are cropped on their top by a pre-defined distance (for example, ¹⁄₁₂) of the height of the page and all object wells bleeding on the bottom side of the page are cropped at their bottom by a pre-defined distance (for example, ¹⁄₁₂) of the height of the page.

All object wells bleeding on the top of the page are cropped on their top by a pre-defined distance (for example, ³⁄₂₄) of the height of the page and all object wells bleeding on the bottom side of the page are cropped at their bottom by a pre-defined distance (for example, ³⁄₂₄) of the height of the page.

For full bleed layouts, all wells with bleeding edge have their bleeding edge cropped by a pre-defined distance (for example, ¹⁄₂₄) of the height of the page.

For full bleed layouts, all wells with bleeding edge have their bleeding edge cropped by a pre-defined distance (for example, ¹⁄₁₂) of the height of the page.

For full bleed layouts, all wells with bleeding edge have their bleeding edge cropped by a pre-defined distance (for example, ³⁄₂₄) of the height of the page.

For all layouts that have at least a vertical band of space of a pre-defined distance (for example, ¹⁄₂₄) of the width of the page on their left and their right, all object wells are moved to the right by a pre-defined distance (for example, ¹⁄₂₄) of the width of the page.

For all layouts that have a vertical band of space of a pre-defined distance (for example, ¹⁄₂₄) of the width of the page on their left and their right, all object wells are moved to the left by a pre-defined distance (for example, ¹⁄₂₄) of the width of the page.

For all original or computed layouts, a central rotation of a pre-determined degree (for example, 90 degrees) is applied.

For all original or computed layouts, a central rotation of a pre-determined degree (for example, −90 degrees) is applied.

For all original or computed layouts, a central rotation of a pre-determined degree (for example, 180 degrees) is applied.

For all original or computed layouts, a central rotation of a pre-determined degree (for example, 180 degrees) is applied.

For all original or computed layouts, a horizontal symmetry is applied.

For all original or computed layouts, a vertical symmetry is applied.

The pre-processing engine 102 can store the transformed layouts in the memory 103 or any other suitable location such as the Cloud, a file server, a data server, and so on.

The pre-processing engine 102 can apply aesthetic validation filtering criteria to the layouts. The criteria can be related to the number of wells in the layout, the placement of wells in the layout (such as size of the wells, location of the wells in the layout, and so on), and so on. In an example herein, a criterion can be 'exclude layouts with an object well having an edge smaller than ⅙ of the width or ⅙ of the height of the page'. The pre-processing engine 102 can further filter out layouts that already present in the memory 103, so that the memory 103 does not include any duplicates. The pre-processing engine 102 can categorize the layouts according to one or more aesthetic categories.

For each object provided by the user, the pre-processing engine 102 can determine a plurality of parameters such as most extreme landscape Region of Interest (ROI), optimum ROI, and most extreme portrait ROI. The most extreme landscape ROI of an object corresponds to the cropping coordinates that result in the most landscape rectangle which does not denature the aesthetic and narrative value of the object. The most extreme portrait ROI of an object correspond to the cropping coordinates that result in the most portrait rectangle which does not denature the aesthetic and narrative value of the object. The optimum ROI for an object corresponds to the cropping coordinates that are optimum for the content and aesthetic of an object. The object normalized slope can be measure as the slope of the diagonal from the bottom left corner to the top right corner of the object. In an embodiment herein, the normalized slope of the most extreme landscape ROI is smaller or equal to the one of the optimum ROI which is also smaller or equal to the slope of the most extreme ROI. In an embodiment herein, the user or an authorized user determines a plurality of parameters such as most extreme landscape Region of Interest (ROI), optimum ROI, and most extreme portrait ROI.

The pre-processing engine 102 can classify the ROI of objects in a plurality of collections such as the intersection of union (IOU) of the possible ROI, based on the slope of the object. The pre-processing engine 102 can classify the ROI of objects in a plurality of categories such as the intersection of union (IOU) of the possible ROI, based on a range of the slope of the object. The pre-processing engine 102 can consider ROIs having a constant rate an intersection over union sequence position of each object in a specific object collection. In an example herein, the pre-processing engine 102 can classify the ROI of objects in a plurality of categories such as the intersection of union (IOU) of the possible ROI, wherein the ROIs having a slope ranging from slopes of ⅛ to ⅙ can be placed together in a single collection. In an embodiment herein, if the object is an image, the sequence position can be based on the Exchangeable object file (EXIF) information. In an embodiment herein, the sequence position can be based a plurality of parameters such as object similarity, object content analysis, user input, filename, and so on.

The pre-processing engine 102 can determine a surface weight for each combination of an object well and an object, wherein the surface weight can be a numerical value. In an embodiment herein, the pre-processing engine 102 can determine the surface weight based on the zoom and closeness level of the photo. The surface weight of an object well in a layout is defined as its percentage surface weight relative to the other wells in the layout. In an example herein, the surface weight of an object is a numerical value ranging between 0.5 and 2.4. In an embodiment herein, the surface weight of an object can be defined by a user or an authorized user. When comparing the surface weight of a collection of objects with the surface weight of wells in a layout, the pre-processing engine 102 can multiply the surface weight of each well by the sum of the surface weights of the objects in the collection of objects.

The pre-processing engine 102 can determine a bounding box for each significant faces for each object containing faces that is to be placed in the layout. A bounding box is a rectangle with an associated rotation angle (if applicable).

The pre-processing engine 102 can determine a minimum percentage and a maximum percentage whitespace that can be present in the layout. White space is defined as the percentage of the surface of the layout that is outside of the wells formed by the edges of the wells respectively located at the most right, most left, most top and most bottom of the layout.

Figure 1D:
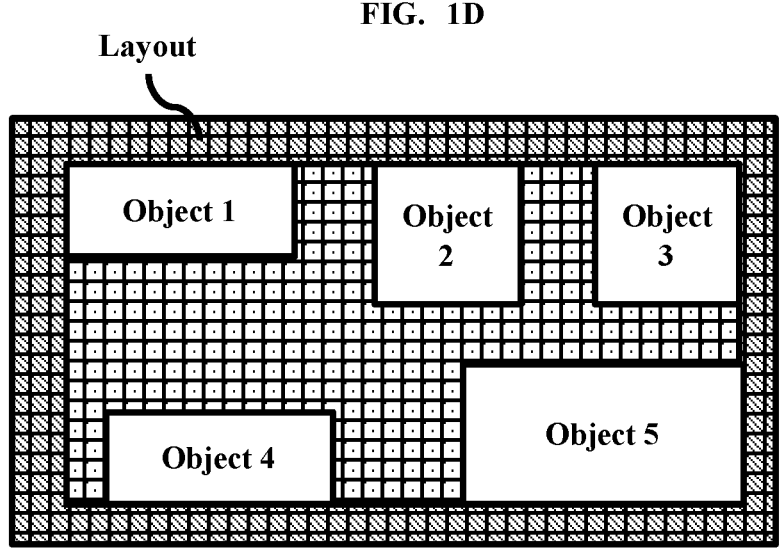
FIG. 1D depicts an example of white space and inset white space in a layout, according to embodiments as disclosed herein.

The pre-processing engine 102 can determine a minimum percentage and maximum percentage inset white space. The inset white space is defined as the ratio of surface area that is not covered by any well inside the rectangle formed by the edges of the wells respectively located at the most right, most left, most top and most bottom of the layout. FIG. 1D depicts an example of white space and inset white space in a layout.

If the spread to be used (also referred to herein as a destination spread or a target spread) has a crease, the pre-processing engine 102 can determine a left-right layout compatibility table and lines of force weight contribution, wherein the weight of line of force is measured as the percentage of the height or width of the layout that is covered by the edge of a well along that line.

The layout management unit 101 can further fetch one or more layouts from the memory 103. In an embodiment herein, the layout management unit 101 can fetch all layouts present in the memory 103. In an embodiment herein, the layout management unit 101 can fetch layouts according to one or more pre-defined categories (wherein these are pre-defined by the user and/or an authorized user using the user interface 104). The layout management unit 101 can abstract the layout in a mathematical construct using a numerical array (such as a Python Numpy array) in which the significant characteristics of the object belonging to a layout are represented in column or a row of the array. Each row comprises a collection of numbers that describe each object in the layout, such as the object coordinates of the upper right and lower left corner of the well, Region of Interest (ROI) category of the well, sequence position of the well, surface weight of the well, and so on.

This mathematical construct may be normalized to make it applicable, irrespective of the aspect ratio(s) or format(s) to which the layout will be rendered; for example, a square or a rectangle of the proportion of a portrait A4 piece of paper, or A5 landscape, US letter landscape, and so on. In an embodiment herein, the layout management unit 101 can limit the degrees of freedom of the positioning of the object wells to a pre-defined grid size. In an example herein, the degrees of freedom of the positioning of the object wells is limited to a grid of 24×24 and 120×120.

In an embodiment herein, the layout management unit 101 can set the grid to a granularity along its horizontal and vertical axis. In an embodiment herein, the layout management unit 101 can set the grid to a different granularity which may be different along its horizontal and vertical axis. In an embodiment herein, the layout management unit 101 can set the grid to a different granularity which may be the same along its horizontal and vertical axis.

In an embodiment herein, the layout management unit 101 can set the edges of the grid relative to the edges of the layout. In an embodiment herein, the layout management unit 101 can set the edges of the grid, such that edges of the grid are aligned with the edges of the layout. In an embodiment herein, the layout management unit 101 can place the grid inside the layout with its outer edges aligned with the edges of the layout or can be placed inside layout with margin(s) on at least one of its sides, wherein the margins may or may not be of identical width and height.

Consider that the destination spread is at least one of a front cover, a back cover, a one-page, a spread with a crease or a spread without a crease. The layout management unit 101 can select a first set of layouts, which have the ROI of their largest surface weight well best matches the optimum ROI of the largest surface weight object in the object set and that meets the object count in the set and the constraints of layout category, minimum/maximum white space and minimum/maximum inset white space. The selected set of layouts can comprise of a pre-determined number of layouts, which have the ROI of their largest surface weight well best matches the optimum ROI of the largest surface weight object in the object set and that meets the object count in the set and the constraints of layout category, minimum/maximum white space and minimum/maximum inset white space. In an example herein, the selected set of layouts can comprise of 1000 layouts, which have the ROI of their largest surface weight well best matches the optimum ROI of the largest surface weight object in the object set and that meets the object count in the set and the constraints of layout category, minimum/maximum white space and minimum/maximum inset white space. The layout management unit 101 can determine the layouts that give the best match as layouts that minimize the absolute difference between the ROI of the well and the ROI of the object.

For each one of the selected layouts, the layout management unit 101 can select at least one alternative symmetric layout that has its well sequence best matching with the object sequence in relation to the respective ROI of the objects and their correspondingly assigned well. The layout management unit 101 can determine at least one alternative symmetric layout as layouts that minimizes the Euclidian distance between the sequence number of the object and of the well. The layout management unit 101 can consider two layouts as alternative symmetric of each other, if there exists a combination of horizontal, vertical or central symmetry transformations which can be applied to transform a first layout into the second layout. In the event that the selected layouts have more than one sequence number, the Euclidian distance/Bray-Curtis dissimilarity/L1 distance is computed for each available sequence number of the layout.

For each layout, the layout management unit 101 can compute a sequence matching score, a ROI matching score and a surface weight matching score. In an embodiment herein, the layout management unit 101 can compute the sequence matching score as the Euclidian distance of the sequence difference between an object position in the set of objects and the physical position of the well in the layout. In an embodiment herein, the layout management unit 101 can compute the ROI matching score as the Euclidian distance between the ROI of the well and the ROI of the object assigned to that well multiplied by the surface weight of the object. In an embodiment herein, the layout management unit 101 can compute the surface weight matching score as the Euclidian distance of the surface weight of the well and the surface weight of the object assigned to that well.

In an embodiment herein, the layout management unit 101 can compute the sequence matching score as the Bray-Curtis dissimilarity of the sequence difference between an object position in the set of objects and the physical position of the well in the layout. In an embodiment herein, the layout management unit 101 can compute the ROI matching score as the Bray-Curtis dissimilarity between the ROI of the well and the ROI of the object assigned to that well multiplied by the surface weight of the object. In an embodiment herein, the layout management unit 101 can compute the surface weight matching score as the Bray-Curtis dissimilarity of the surface weight of the well and the surface weight of the object assigned to that well.

In an embodiment herein, the layout management unit 101 can compute the sequence matching score as the L1 distance of the sequence difference between an object position in the set of objects and the physical position of the well in the layout. In an embodiment herein, the layout management unit 101 can compute the ROI matching score as the L1 distance between the ROI of the well and the ROI of the object assigned to that well multiplied by the surface weight of the object. In an embodiment herein, the layout management unit 101 can compute the surface weight matching score as the L1 distance of the surface weight of the well and the surface weight of the object assigned to that well.

The layout management unit 101 can filter out layouts whose individual scores (sequence, ROI or surface weight) or whose objective function of combined scores do not exceed a pre-defined threshold. In an example herein, the layout management unit 101 filters out layouts whose individual scores (sequence, ROI or surface weight) or whose objective function of combined scores do not exceed a pre-defined threshold of 4. The layout management unit 101 can compute the objective function by combining those scores as follows:

$$\text{objective function} = \frac{ROI \text{ matching score}}{(\text{number of wells})^2} +$$

-continued
$$\frac{\text{surface weight matching score}}{\sqrt{\text{number of wells}}} + \frac{\text{Sequence matching score}}{\text{number of wells}}$$

The layout management unit 101 can then group the remaining layouts by their aesthetic category. The layout management unit 101 can sort layouts inside each category by ascending value of the objective function. The layout management unit 101 can consider the layout with the lowest objective function value to be the best matching layout for that aesthetic category. The layout management unit 101 can consider the layouts with the lowest objective function value in each aesthetic category to be the best alternate layouts. The layout management unit 101 can consider a pre-defined number of layouts with the lowest objective function value for each category to be the best similar layouts of an aesthetic group. In an example herein, the layout management unit 101 can consider the 5 layouts with the lowest objective function value for each category to be the best similar layouts of an aesthetic group.

If the target spread is a 2-page layout with a crease, a right|left page assignment for each object may be provided. Depending on the number of objects in the object set and the ROI of the objects with the higher surface weight, in an embodiment herein, the layout management unit 101 can perform the steps as disclosed above for the 2 pages on each side of the crease.

Depending on the number of objects in the object set and the ROI of the objects with the higher surface weight, in an embodiment herein, the layout management unit 101 can split the set of objects in two groups (as the crease splits the layout into two portions) so that the sum of surface weights is as similar as possible, if the right|left page assignment has not been specified. In an embodiment herein, the sequence of the objects cannot be changed. In an embodiment herein, when the object set contains a pre-defined number of objects (for example, 4) and have some specific ROI values, the layout management unit 101 can consider an exception and can change the sequence of objects (if required). In an example, if an object has a normalized slope smaller than ¼ and has a surface weight above 1.2, the layout management unit 101 does not split the object set.

For the set of objects associated to the left page, the layout management unit 101 considers that the target spread is a 1-page spread. The layout management unit 101 can select a first set of layouts, which have the ROI of their largest surface weight well best matches the optimum ROI of the largest surface weight object in the object set and that meets the object count in the set and the constraints of layout category, minimum/maximum white space and minimum/ maximum inset white space. The selected set of layouts can comprise of a pre-determined number of layouts, which have the ROI of their largest surface weight well best matches the optimum ROI of the largest surface weight object in the object set and that meets the object count in the set and the constraints of layout category, minimum/maximum white space and minimum/maximum inset white space. In an example herein, the selected set of layouts can comprise of 1000 layouts, which have the ROI of their largest surface weight well best matches the optimum ROI of the largest surface weight object in the object set and that meets the object count in the set and the constraints of layout category, minimum/maximum white space and minimum/ maximum in set white space. The layout management unit 101 can determine the layouts that give the best match as layouts that minimize the absolute difference between the ROI of the well and the ROI of the object.

For each one of the selected layouts, the layout management unit 101 can select at least one alternative symmetric layout that has its well sequence best matching with the object sequence in relation to the respective ROI of the objects and their correspondingly assigned well. The layout management unit 101 can determine at least one alternative symmetric layout as layouts that minimizes the Euclidian distance between the sequence number of the object and of the well. The layout management unit 101 can consider two layouts as alternative symmetric of each other, if there exists a combination of horizontal, vertical or central symmetry transformations which can be applied to transform a first layout into the second layout. In the event that the selected layouts have more than one sequence number, the Euclidian distance/Bray-Curtis dissimilarity/L1 distance is computed for each available sequence number of the layout.

For each layout, the layout management unit 101 can compute a sequence matching score, a ROI matching score and a surface weight matching score. In an embodiment herein, the layout management unit 101 can compute the sequence matching score as the Euclidian distance of the sequence difference between an object position in the set of objects and the physical position of the well in the layout. In an embodiment herein, the layout management unit 101 can compute the ROI matching score as the Euclidian distance between the ROI of the well and the ROI of the object assigned to that well multiplied by the surface weight of the object. In an embodiment herein, the layout management unit 101 can compute the surface weight matching score as the Euclidian distance of the surface weight of the well and the surface weight of the object assigned to that well.

In an embodiment herein, the layout management unit 101 can compute the sequence matching score as the Bray-Curtis dissimilarity of the sequence difference between an object position in the set of objects and the physical position of the well in the layout. In an embodiment herein, the layout management unit 101 can compute the ROI matching score as the Bray-Curtis dissimilarity between the ROI of the well and the ROI of the object assigned to that well multiplied by the surface weight of the object. In an embodiment herein, the layout management unit 101 can compute the surface weight matching score as the Bray-Curtis dissimilarity of the surface weight of the well and the surface weight of the object assigned to that well.

In an embodiment herein, the layout management unit 101 can compute the sequence matching score as the L1 distance of the sequence difference between an object position in the set of objects and the physical position of the well in the layout. In an embodiment herein, the layout management unit 101 can compute the ROI matching score as the L1 distance between the ROI of the well and the ROI of the object assigned to that well multiplied by the surface weight of the object. In an embodiment herein, the layout management unit 101 can compute the surface weight matching score as the L1 distance of the surface weight of the well and the surface weight of the object assigned to that well.

The layout management unit 101 can filter out layouts whose individual scores (sequence, ROI or surface weight) or whose objective function of combined scores do not exceed a pre-defined threshold. In an example herein, the layout management unit 101 filters out layouts whose individual scores (sequence, ROI or surface weight) or whose objective function of combined scores do not exceed a pre-defined threshold of 4. The layout management unit 101 can compute the objective function by combining those scores as follows:

$$\text{objective function} = \frac{ROI \text{ matching score}}{(\text{number of wells})^2} + \frac{\text{surface weight matching score}}{\sqrt{\text{number of wells}}} + \frac{\text{Sequence matching score}}{\text{number of wells}}$$

The layout management unit 101 can then group remaining layout by their aesthetic category. The layout management unit 101 can sort layouts inside each category by ascending value of the objective function. The layout management unit 101 can consider the layout with the lowest objective function value to be the best matching layout for that aesthetic category. The layout management unit 101 can consider the layouts with the lowest objective function value in each aesthetic category to be the best alternate layouts. The layout management unit 101 can consider a pre-defined number of layouts with the lowest objective function value for each category to be the best similar layouts of an aesthetic group. In an example herein, the layout management unit 101 can consider the 5 layouts with the lowest objective function value for each category to be the best similar layouts of an aesthetic group.

For the set of objects associated to the right page, the layout management unit 101 considers that the target spread is a 1-page spread. The layout management unit 101 can select a first set of layouts, which have the ROI of their largest surface weight well best matches the optimum ROI of the largest surface weight object in the object set and that meets the object count in the set and the constraints of layout category, minimum/maximum white space and minimum/maximum inset white space. The selected set of layouts can comprise of a pre-determined number of layouts, which have the ROI of their largest surface weight well best matches the optimum ROI of the largest surface weight object in the object set and that meets the object count in the set and the constraints of layout category, minimum/maximum white space and minimum/maximum inset white space. In an example herein, the selected set of layouts can comprise of 1000 layouts, which have the ROI of their largest surface weight well best matches the optimum ROI of the largest surface weight object in the object set and that meets the object count in the set and the constraints of layout category, minimum/maximum white space and minimum/maximum in set white space. The layout management unit 101 can determine the layouts that give the best match as layouts that minimize the absolute difference between the ROI of the well and the ROI of the object.

For each one of the selected layouts, the layout management unit 101 can select at least one alternative symmetric layout that has its well sequence best matching with the object sequence in relation to the respective ROI of the objects and their correspondingly assigned well. The layout management unit 101 can determine at least one alternative symmetric layout as layouts that minimizes the Euclidian distance between the sequence number of the object and of the well. The layout management unit 101 can consider two layouts as alternative symmetric of each other, if there exists a combination of horizontal, vertical or central symmetry transformations which can be applied to transform a first layout into the second layout. In the event that the selected layouts have more than one sequence number, the Euclidian distance/Bray-Curtis dissimilarity/L1 distance is computed for each available sequence number of the layout.

For each layout, the layout management unit 101 can compute a sequence matching score, a ROI matching score and a surface weight matching score.

In an embodiment herein, the layout management unit 101 can compute the sequence matching score as the Euclidian distance of the sequence difference between an object position in the set of objects and the physical position of the well in the layout. In an embodiment herein, the layout management unit 101 can compute the ROI matching score as the Euclidian distance between the ROI of the well and the ROI of the object assigned to that well multiplied by the surface weight of the object. In an embodiment herein, the layout management unit 101 can compute the surface weight matching score as the Euclidian distance of the surface weight of the well and the surface weight of the object assigned to that well.

In an embodiment herein, the layout management unit 101 can compute the sequence matching score as the Bray-Curtis dissimilarity of the sequence difference between an object position in the set of objects and the physical position of the well in the layout. In an embodiment herein, the layout management unit 101 can compute the ROI matching score as the Bray-Curtis dissimilarity between the ROI of the well and the ROI of the object assigned to that well multiplied by the surface weight of the object. In an embodiment herein, the layout management unit 101 can compute the surface weight matching score as the Bray-Curtis dissimilarity of the surface weight of the well and the surface weight of the object assigned to that well.

In an embodiment herein, the layout management unit 101 can compute the sequence matching score as the L1 distance of the sequence difference between an object position in the set of objects and the physical position of the well in the layout. In an embodiment herein, the layout management unit 101 can compute the ROI matching score as the L1 distance between the ROI of the well and the ROI of the object assigned to that well multiplied by the surface weight of the object. In an embodiment herein, the layout management unit 101 can compute the surface weight matching score as the L1 distance of the surface weight of the well and the surface weight of the object assigned to that well.

The layout management unit 101 can filter out layouts whose individual scores (sequence, ROI or surface weight) or whose objective function of combined scores do not exceed a pre-defined threshold. In an example herein, the layout management unit 101 filters out layouts whose individual scores (sequence, ROI or surface weight) or whose objective function of combined scores do not exceed a pre-defined threshold of 4. The layout management unit 101 can compute the objective function by combining those scores as follows:

$$\text{objective function} = \frac{ROI \text{ matching score}}{(\text{number of wells})^2} + \frac{\text{surface weight matching score}}{\sqrt{\text{number of wells}}} + \frac{\text{Sequence matching score}}{\text{number of wells}}$$

The layout management unit 101 can then group remaining layout by their aesthetic category. The layout management unit 101 can sort layouts inside each category by ascending value of the objective function. The layout management unit 101 can consider the layout with the lowest objective function value to be the best matching layout for that aesthetic category. The layout management unit 101 can consider the layouts with the lowest objective function value in each aesthetic category to be the best alternate layouts. The layout management unit 101 can consider a pre-defined number of layouts with the lowest objective function value for each category to be the best similar layouts of an aesthetic group. In an example herein, the layout management unit 101 can consider the 5 layouts with the lowest objective function value for each category to be the best similar layouts of an aesthetic group.

Using the constraint of the left|right compatibility table, the layout management unit 101 can combine the layout with the lowest objective function value in a layout category of the left page with the corresponding one of another compatible category for the right page. For each combination, the layout management unit 101 can compute the combined objective function score. This objective function is a combination of a margin compatibility score, combination of the objective function of each layout and line of forces score.

$$\text{Combined objective function} = \sqrt{\text{objective function of left} - \text{page layout}} + \sqrt{\text{objective function of right} - \text{page layout}} + (\text{objective function of the line of forces})^3$$

The layout management unit 101 can select the layout with the lowest combined objective function as the best matching layout.

Figure 2:
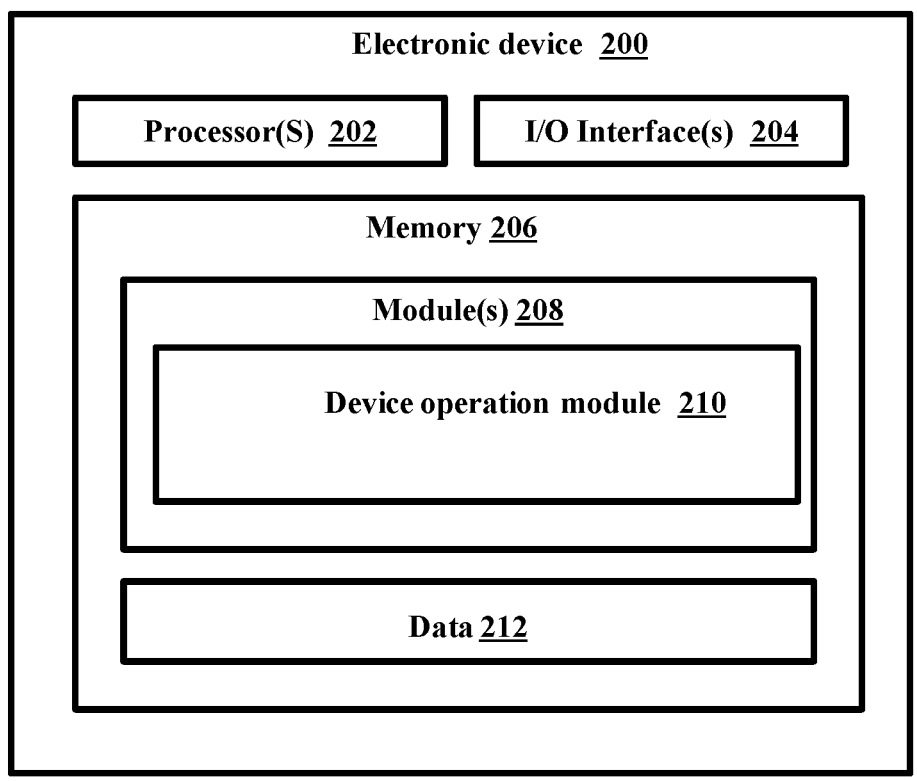
FIG. 2 is a block diagram illustrating a plurality of components of an electronic device for determining the structure of a sorted collection list of layouts by optimizing the organization of a collection of objects on a layout based on series of narrative and aesthetic criteria that vary for each set of objects and/or layout, according to embodiments as disclosed herein.

FIG. 2 is a block diagram illustrating a plurality of components of an electronic device 200 for determining the structure of a sorted collection list of layouts by optimizing the organization of a collection of objects on a layout based on series of narrative and aesthetic criteria that vary for each set of objects and/or layout. The device 200 can be any device that can create and manage a digital object layout. Examples of the device 200 can be, but not limited to, a computer, a laptop, a smart phone, a mobile phone, a tablet, a wearable device, a server, the Cloud, and so on.

Referring to FIG. 2, the electronic device 200 is illustrated in accordance with an embodiment of the present subject matter. In an embodiment, the electronic device 200 may include at least one processor 202, an input/output (I/O) interface 204 (herein a configurable user interface), and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces; for example, a web interface, a graphical user interface such as a display screen, a physical interface, and the like. The I/O interface 204 may allow the electronic device 200 to communicate with other devices. The I/O interface 204 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 208 include routines, programs, objects, components, data structures, and so on, which perform particular tasks, functions or implement particular abstract data types. In one implementation, the modules 208 may include a device operation module 210. The device operation module 210 can be configured for determining the structure of a sorted collection list of layouts by optimizing the organization of a collection of objects on a layout based on series of narrative and aesthetic criteria that vary for each set of objects and/or layout. The device operation module 210 can be configured to execute one or more tasks corresponding to the application on the electronic device 200 in accordance with embodiments as disclosed herein.

The device operation module 210 can select layouts by run-time implementation of layout design method with, possibly but not limited to, the parameters such as well normalized slope, well categories, layout height and width, minimum and maximum relative white space, maximum relative white space, minimum and maximum interstitial vertical and horizontal space between wells, minimum and maximum percentage of well overlap. The device operation module 210 can further combine left and right one-page layout pairs in compliance with the page adjacency compatibility rules of specified aesthetic style.

The device operation module 210 can select in an existing set of layouts and/or dynamically generate a collection of layouts that meet the aesthetic requirements and closely match the categories and slopes of the wells defined in the layout with the objects and the relative surface area of the wells in the layout with the narrative importance of each object assigned to that layout.

For each selected layout, the device operation module 210 can identify in an existing set of layouts and/or dynamically generate the member(s) of the alternative symmetric family, which minimizes the mismatch between the object narrative sequence and layout well sequence. In an embodiment herein, the mismatch function can be a parameterized Euclidean distance accounting for the narrative importance of the objects. The device operation module 210 can compute the objective function. The objective function is representative of the match of a layout with the narrative and aesthetic constraints of the object set. The structure and weights associated with this objective function can be dependent on the category of layout, the aesthetic style of the layout, the number of objects of the layout, the nature of the media or device on which the layout will be printed of display, the aspect ratio of the layout. The device operation module 210 can retain the layouts whose objective function scores are below a specified threshold. The device operation module 210 can return the layout of each cluster, which minimizes the objective function as a recommended layout.

The modules 208 may include programs or coded instructions that supplement applications and functions of the electronic device 200. The data 212, amongst other things, serves as a repository for storing data processed, received, and generated by one or more of the modules 208. Further, the names of the other components and modules of the electronic device 200 are illustrative and need not be construed as a limitation.

The memory 206 may include one or more computer-readable storage media. The memory 206 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 206 may, in some examples, be considered a non-transitory storage medium. The term "non-transitory" may indicate that the storage medium is not embodied in a carrier wave or a propagated signal. However, the term "non-transitory" should not be interpreted to mean that the memory 206 is non-movable. In some examples, the memory 206 can be configured to store larger amounts of information than the memory. In certain examples, a non-transitory storage medium may store data that can, over time, change (e.g., in Random Access Memory (RAM) or cache).

FIG. 2 shows exemplary units of the device(s), but it is to be understood that other embodiments are not limited thereon. In other embodiments, the device(s) may include less or more number of units. Further, the labels or names of the units are used only for illustrative purpose and does not limit the scope of the embodiments herein. One or more units can be combined together to perform same or substantially similar function in the device.

Figure 3:
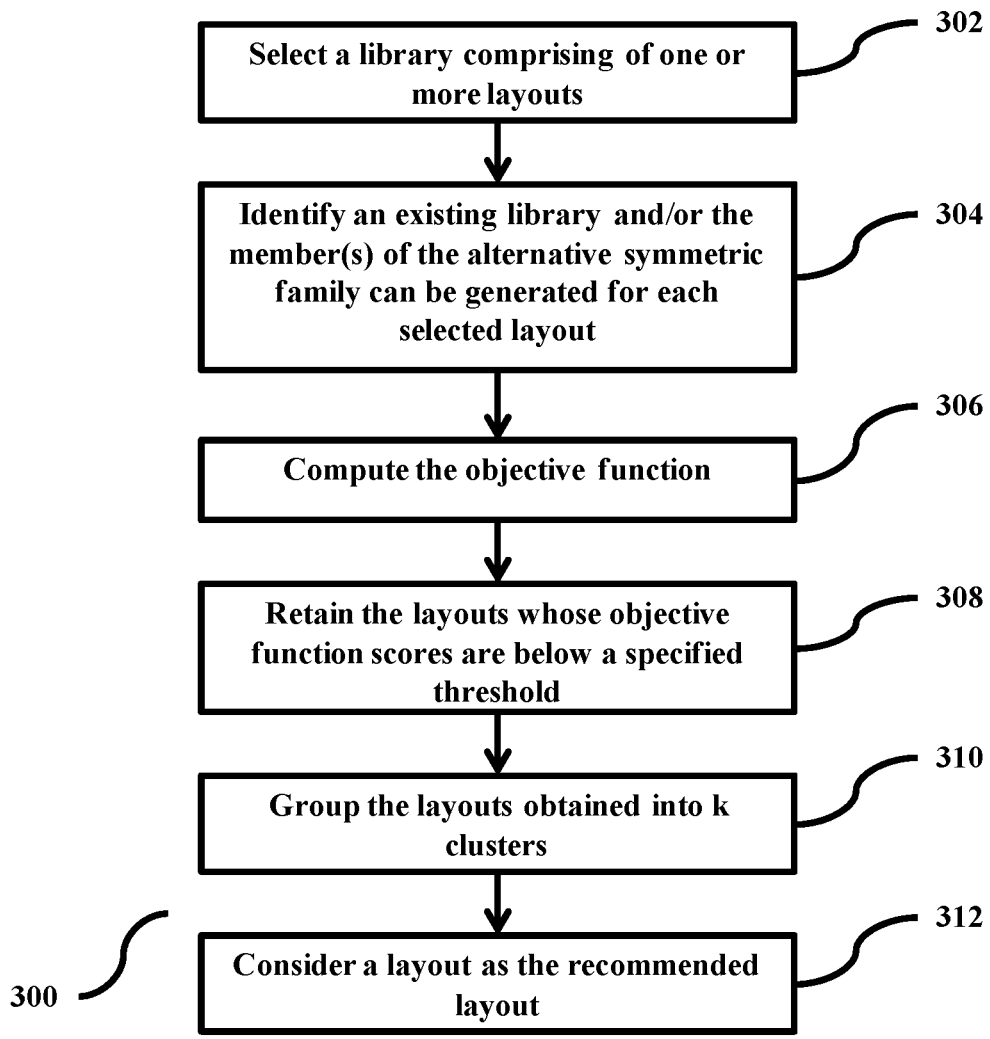
FIG. 3 is a flowchart depicting the process of determining the structure of a sorted collection list of layouts by optimizing the organization of a collection of objects on a layout based on series of narrative and aesthetic criteria that vary for each set of objects and/or layout, according to embodiments as disclosed herein.

FIG. 3 is a flowchart depicting the process of determining the structure of a sorted collection list of layouts by optimizing the organization of a collection of objects on a layout based on series of narrative and aesthetic criteria that vary for each set of objects and/or layout. In step 302, a library comprising of one or more layouts can be selected, wherein the layouts can be selected from an existing library and/or dynamically generated that meet the aesthetic requirements and closely match the categories and slopes of the wells defined in the layout with the objects and the relative surface area of the wells in the layout with the narrative importance of each object assigned to that layout. In step 304, an existing library can be identified and/or the member(s) of the alternative symmetric family can be generated for each selected layout, which minimizes the mismatch between the object narrative sequence and layout well sequence. In an embodiment herein, the mismatch function can be a parameterized Euclidean distance accounting for the narrative importance of the objects. In step 306, the objective function is computed. In step 308, the layouts whose objective function scores are below a specified threshold are retained. In step 310, the layouts obtained are grouped into k clusters according to machine learning based clustering method and/or according to their aesthetic vectors using a suitable clustering method so that visually similar layouts are grouped together independently of their objective function score. In step 312, a layout is considered as the recommended layout, wherein the recommended layout minimizes the objective function as a recommended layout. The various actions in method 300 may be performed in the order presented, in a different order or simultaneously. Further, in some embodiments, some actions listed in FIG. 3 may be omitted.

FIG. 4 is a flowchart depicting the process a plurality of layouts and storing the layouts. The pre-processing engine 102 performs (402) at least one geometric transformation on a plurality of layouts, wherein examples of the geometric transformation can be, but not limited to, central shrinking, directional panning, side (top, bottom, left, right) cropping, rotation, symmetry and any combination of those operations. The pre-processing engine 102 applies (404) an aesthetic validation filtering criteria to the layouts, wherein the criteria can be related to the number of wells in the layout, the placement of wells in the layout (such as size of the wells, location of the wells in the layout, and so on), and so on. For each object provided by the user, the pre-processing engine 102 determines (406) a plurality of parameters such as most extreme landscape Region of Interest (ROI), optimum ROI, and most extreme portrait ROI. The pre-processing engine 102 classifies (408) the ROI of objects in a plurality of collections such as the intersection of union (IOU) of the possible ROI, based on the slope of the object. The pre-processing engine 102 determines (410) the surface weight for each combination of an object well and an object, wherein the surface weight can be a numerical value, wherein the surface weight of an object well in a layout is its percentage surface weight relative to the other wells in the layout. The pre-processing engine 102 determines (412) a bounding box of significant faces for each object that is to be placed in the layout, wherein the bounding box can depend on the object or a collection of objects and their respective ROIs. The pre-processing engine 102 determines (414) the minimum percentage and a maximum percentage whitespace that can be present in the layout. The pre-processing engine 102 determines (416) the minimum percentage and maximum percentage in set white space. The various actions in method 400 may be performed in the order presented, in a different order or simultaneously. Further, in some embodiments, some actions listed in FIG. 4 may be omitted.

Figure 5B:
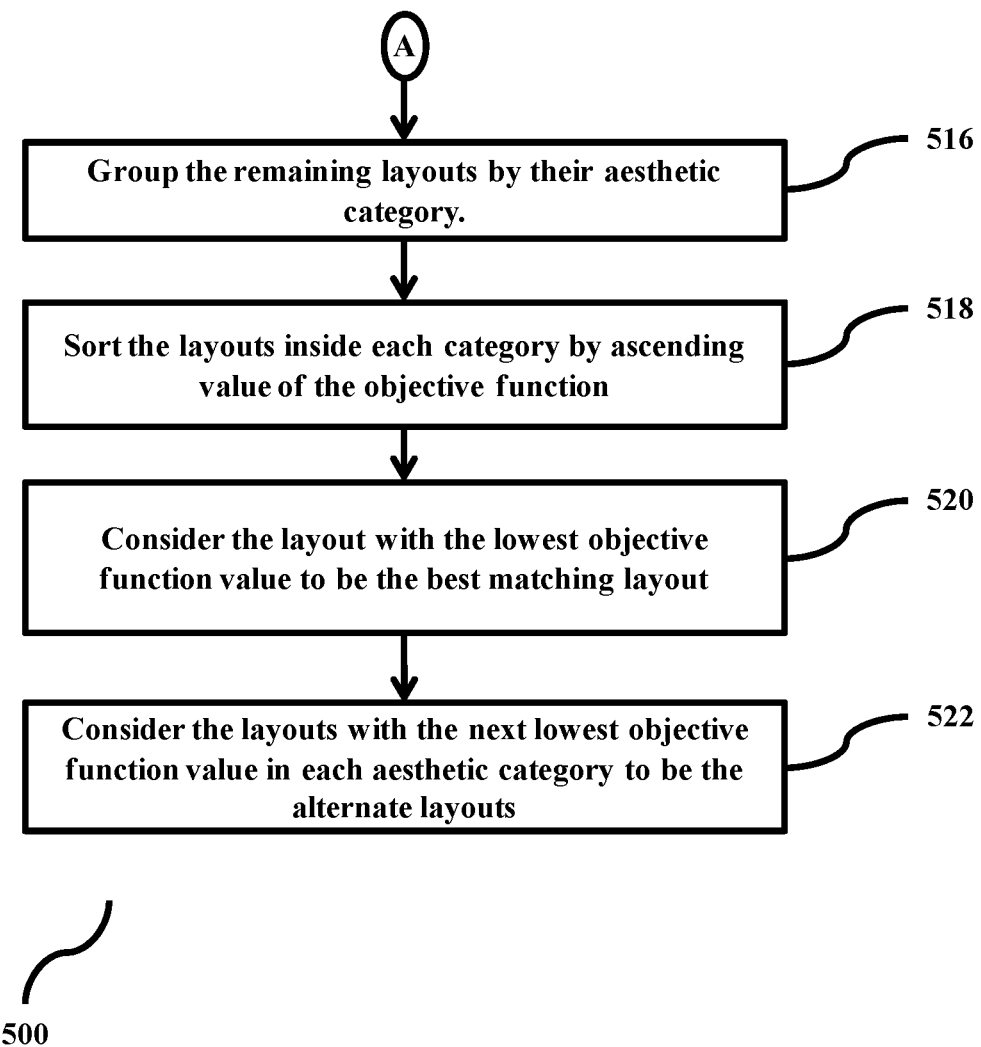

FIGS. 5A and 5B are flowcharts depicting the process of determining the structure of a sorted collection list of layouts by optimizing the organization of a collection of objects on a layout based on series of narrative and aesthetic criteria that vary for each set of objects and/or layout, wherein the destination spread is at least one of a front cover, a back cover, a one-page or a spread without a crease. The layout management unit 101 abstracts (502) one or more fetched layouts in a mathematical construct using a numerical array (such as a Python Numpy array) in which the significant characteristics of the object belonging to a layout are represented in column or a row of the array. Each row comprises a collection of numbers that describe that object well, such as coordinates of the upper right and lower left corner of the well, Region of Interest (ROI) category of the well, sequence position of the well, surface weight of the well, and so on. This mathematical construct is applicable, irrespective of the aspect ratio(s) or format(s) to which the layout will be rendered. The layout management unit 101 sets (504) the grid to a granularity along its horizontal and vertical axis. The layout management unit 101 sets (506) the edges of the grid relative to the edges of the layout. The layout management unit 101 selects (508) a first set of layouts, which have the ROI of their largest surface weight well best matches the optimum ROI of the largest surface weight object in the object set and that meets the object count in the set and the constraints of layout category, minimum/maximum white space and minimum/maximum inset white space. For each one of the selected layouts, the layout management unit 101 selects (510) at least one alternative symmetric layout that has its well sequence best matching with the object sequence in relation to the respective ROI of the objects and their correspondingly assigned well, wherein the at least one alternative symmetric layout is a layout that minimizes the Euclidian distance between the sequence number of the object and of the well. For each layout, the layout management unit 101 computes (512) the sequence matching score, the ROI matching score and the surface weight matching score. The layout management unit 101 computes the sequence matching score as the Euclidian distance of the sequence difference between an object position in the set of objects and the physical position of the well in the layout. The layout management unit 101 computes the ROI matching score as the Euclidian distance between the ROI of the well and the ROI of the object assigned to that well multiplied by the surface weight of the object. The layout management unit 101 computes the surface weight matching score as the Euclidian distance of the surface weight of the well and the surface weight of the object assigned to that well. The layout management unit 101 filters out (514) layouts whose individual scores (sequence, ROI or surface weight) or whose objective function of combined scores do not exceed a pre-defined threshold. The layout management unit 101 then groups (516) the remaining layouts by their aesthetic category. The layout management unit 101 sorts (518) layouts inside each category by ascending value of the objective function. The layout management unit 101 considers (520) the layout with the lowest objective function value to be the best matching layout and considers (522) the layouts with the next lowest objective function value in each aesthetic category to be the alternate layouts. The various actions in method 500 may be performed in the order presented, in a different order or simultaneously. Further, in some embodiments, some actions listed in FIG. 5 may be omitted.

Figure 6:
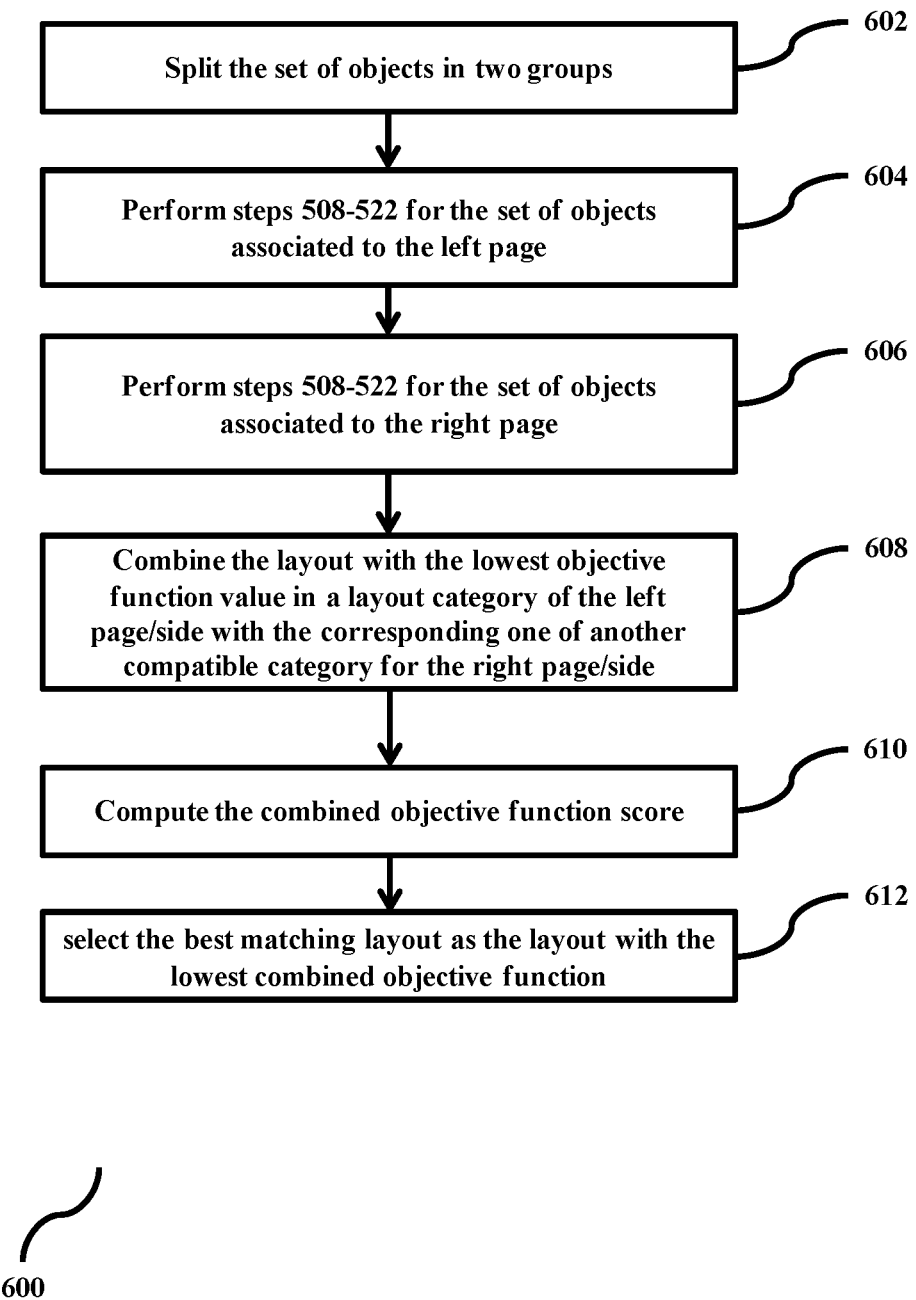
FIG. 6 is a flowchart depicting the process of determining the structure of a sorted collection list of layouts by optimizing the organization of a collection of objects on a layout based on series of narrative and aesthetic criteria that vary for each set of objects and/or layout, wherein the target spread is a 2-page layout with a crease, according to embodiments as disclosed herein.

FIG. 6 is a flowchart depicting the process of determining the structure of a sorted collection list of layouts by optimizing the organization of a collection of objects on a layout based on series of narrative and aesthetic criteria that vary for each set of objects and/or layout, wherein the target spread is a 2-page layout with a crease. Depending on the number of objects in the object set and the ROI of the objects with the higher surface weight, the layout management unit 101 splits (602) the set of objects in two groups (as the crease splits the layout into two portions) so that the sum of surface weights is as similar as possible, if the right|left page assignment has not been specified. For the set of objects associated to the left page, the layout management unit 101 considers that the target spread is a 1-page spread and performs (604) steps 508-522 (as depicted in FIG. 5). For the set of objects associated to the right page, the layout management unit 101 considers that the target spread is a 1-page spread and performs (606) steps 508-522 (as depicted in FIG. 5). Using the constraint of the left|fight compatibility table, the layout management unit 101 combines (608) the layout with the lowest objective function value in a layout category of the left page/side with the corresponding one of another compatible category for the right page/side. For each combination, the layout management unit 101 computes (610) the combined objective function score, which is a combination of a margin compatibility score, combination of the objective function of each layout and line of forces score. The layout management unit 101 select (612) the best matching layout as the layout with the lowest combined objective function. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The network elements shown in FIG. 2 include blocks, which can be at least one of a hardware device, or a combination of hardware device and software module.

The embodiment disclosed herein specifies a system for determining the structure of a sorted collection list of layouts by optimizing the organization of a collection of objects on a layout based on series of narrative and aesthetic criteria that vary for each set of objects and/or layout. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A method for determining at least one layout to be used for arranging at least one object, the method comprising steps of:
    abstracting, by a layout management unit, a plurality of fetched layouts in a construct using a numerical array, wherein at least one of a column or a row of the numerical array represent at least one significant characteristic of the at least one object belonging to the plurality of fetched layouts;
    setting, by the layout management unit, a grid in the plurality of fetched layouts to a granularity along its horizontal and vertical axis;
    setting, by the layout management unit, a plurality of edges of the grid, relative to a plurality of edges of the respective layout of the plurality of fetched layouts;
    selecting, by the layout management unit, a first set of layouts comprising a Region of Interest (ROI) corresponding to largest surface weight well that best matches with an optimum ROI of a largest surface weight object in an object set, and that meets at least one of an object count in the first set of layouts, a constraints of layout category, a minimum/maximum white space and a minimum/maximum inset white space, wherein the white space and the inset white space comprises a percentage of surface of the layout that is outside of the wells and a ratio of surface area that is not covered by well inside the rectangle respectively formed by the edges of the wells respectively located at the most right, most left, most top and most bottom of the layout;
    selecting, by the layout management unit, at least one alternative symmetric layout for each one of the selected layouts of the first set of layouts, that comprises a well sequence best matching with an object sequence, in relation to the respective ROI of the objects and correspondingly assigned respective well;
    computing, by the layout management unit, a sequence matching score, a ROI matching score and a surface weight matching score for each layout of the selected at least one alternative symmetric layout;
    filtering out, by the layout management unit, the layouts of the selected at least one alternative symmetric layout, based on the computed at least one of the sequence matching score, the ROI matching score and the surface weight matching score, and an objective function of combined scores corresponding to the sequence matching score, the ROI matching score and the surface weight matching score, of the layouts does not exceed a pre-defined threshold, wherein the combined objective function score is a combination of a margin compatibility score, combination of the objective function of each layout, and a line of forces score;
    grouping, by the layout management unit, the filtered layouts by an aesthetic category of the filtered layouts, based on a position of wells in the filtered layouts, wherein the aesthetic categorization is independent of the number of wells that the layouts contain;
    sorting, by the layout management unit, layouts inside each category by ascending value of the objective function, wherein sorting the layouts inside each category comprises considering the layout with the lowest objective function value to be the best matching layout for respective aesthetic category, best alternate layouts, best similar layouts of an aesthetic group; and
    determining, by the layout management unit, at least one layout to be used for arranging at least one object, by considering the layout with the lowest objective function value for each aesthetic category to be a best matching layout for each aesthetic category.

2. The method, as claimed in claim 1, wherein the at least one alternative symmetric layout is a layout that minimizes at least one of a Euclidian distance, a Bray-Curtis Dissimilarity, and a L1 distance between the sequence number of the object and of the well.

3. The method, as claimed in claim 1, wherein the layout management unit computes the sequence matching score as at least one of a Euclidian distance, a Bray-Curtis Dissimilarity, and a L1 distance of a sequence difference between an object position in the set of objects and a physical position of the well in the layout.

4. The method, as claimed in claim 1, wherein the layout management unit computes the ROI matching score as at least one of a Euclidian distance, a Bray-Curtis Dissimilarity, and a L1 distance between a ROI of the well and a ROI of the object assigned to that well multiplied by a surface weight of the object.

5. The method, as claimed in claim 1, wherein the layout management unit computes the surface weight matching score as at least one of a Euclidian distance, a Bray-Curtis Dissimilarity, and a L1 distance of a surface weight of the well and the surface weight of the object assigned to that well.

6. The method, as claimed in claim 1, wherein the layout management unit determines layouts with the lowest objective function value in each aesthetic category to be an alternate layout.

7. The method, as claimed in claim 1, wherein the layout management unit determines at least one layout to be used for arranging at least one object, wherein the layouts comprises different categories such as a target spread, wherein the target spread comprises a 2-page layout with a crease by:
   determining, by the layout management unit, at least one layout for each half of the target spread;
   combining, by the layout management unit, a layout with the lowest objective function value in a layout aesthetic category of a left side with a corresponding one of another compatible aesthetic category for a right side;
   computing, by the layout management unit, a combined objective function score for each combination; and
   selecting, by the layout management unit, the best matching layout as a layout with a lowest combined objective function.

8. The method, as claimed in claim 7, wherein the combined objective function score is a combination of a margin compatibility score, combination of the objective function of each layout and lines of force score.

9. A systems for determining at least one layout to be used for arranging at least one object, the system comprising:
   at least one device; and
   a layout management engine communicatively coupled to the at least one device, wherein the layout management engine comprises
      a pre-processing engine;
      at least one user interface;
      a memory; and
      a layout management unit coupled to the pre-processing engine, wherein the layout management unit is configured to perform steps of:
         abstracting a plurality of fetched layouts in a construct using a numerical array, wherein at least one of a column or a row of the numerical array represent at least one significant characteristic of the at least one object belonging to the plurality of fetched layouts;
         setting a grid in the plurality of fetched layouts to a granularity along its horizontal and vertical axis;
         setting a plurality of edges of the grid relative to a plurality of edges of the respective layout of the plurality of fetched layouts;
         selecting a first set of layouts comprising a Region of Interest (ROI) corresponding to largest surface weight well that best matches with an optimum ROI of a largest surface weight object in an object set, and that meets at least one of an object count in the first set of layouts, a constraints of layout category, a minimum/maximum white space and a minimum/maximum inset white space, wherein the white space and the inset white space comprises a percentage of surface of the layout that is outside of the wells and a ratio of surface area that is not covered by well inside the rectangle respectively formed by the edges of the wells respectively located at the most right, most left, most top and most bottom of the layout;
         selecting at least one alternative symmetric layout for each one of the selected layouts of the first set of layouts, that comprises a well sequence best matching with an object sequence, in relation to the respective ROI of the objects and correspondingly assigned respective well;
         computing a sequence matching score, a ROI matching score and a surface weight matching score for each layout of the selected at least one alternative symmetric layout;
         filtering out the layouts of the selected at least one alternative symmetric layout, based on the computed at least one of the sequence matching score, the ROI matching score and the surface weight matching score, and an objective function of combined scores corresponding to the sequence matching score, the ROI matching score and the surface weight matching score, of the layouts does not exceed a pre-defined threshold, wherein the combined objective function score is a combination of a margin compatibility score, combination of the objective function of each layout, and a line of forces score;
         grouping the filtered layouts by an aesthetic category of the filtered layouts, based on a position of wells in the filtered layouts, wherein the aesthetic categorization is independent of the number of wells that the layouts contain;
         sorting inside each category by ascending value of the objective function, wherein sorting the layouts inside each category comprises considering the layout with the lowest objective function value to be the best matching layout for respective aesthetic category, best alternate layouts, best similar layouts of an aesthetic group; and
         determining at least one layout to be used for arranging at least one object, by considering the layout with the lowest objective function value for each aesthetic category to be a best matching layout for each aesthetic category.

10. The system, as claimed in claim 9, wherein the at least one alternative symmetric layout is a layout that minimizes at least one of a Euclidian distance, a Bray-Curtis Dissimilarity, and a L1 distance between the sequence number of the object and of the well.

11. The system, as claimed in claim 9, wherein the layout management unit is configured for computing the sequence matching score as at least one of a Euclidian distance, a Bray-Curtis Dissimilarity, and a L1 distance of a sequence difference between an object position in the set of objects and a physical position of the well in the layout.

12. The system, as claimed in claim 9, wherein the layout management unit is configured for computing the ROI matching score as at least one of a Euclidian distance, a Bray-Curtis Dissimilarity, and a L1 distance between a ROI of the well and a ROI of the object assigned to that well multiplied by a surface weight of the object.

13. The system, as claimed in claim 9, wherein the layout management unit is configured for computing the surface weight matching score as at least one of a Euclidian distance, a Bray-Curtis Dissimilarity, and a L1 distance of a surface weight of the well and the surface weight of the object assigned to that well.

14. The system, as claimed in claim 9, wherein the layout management unit is configured for determining layouts with the lowest objective function value in each aesthetic category to be an alternate layout.

15. The system, as claimed in claim 9, wherein the layout management unit is configured for determining at least one layout to be used for arranging at least one object, wherein the layouts comprises different categories such as a target spread, wherein the target spread comprises a 2-page layout with a crease by:
- determining at least one layout for each half of the target spread;
- combining a layout with the lowest objective function value in a layout aesthetic category of a left side with a corresponding one of another compatible aesthetic category for a right side;
- computing a combined objective function score for each combination; and
- selecting the best matching layout as a layout with a lowest combined objective function.

16. The system, as claimed in claim 15, wherein the combined objective function score is a combination of a margin compatibility score, combination of the objective function of each layout and lines of force score.

* * * * *